Feb. 25, 1930.                    U. MEYER                    1,748,453
               METHOD OF REPAIRING PUPINIZED SUBMARINE CABLES
                         Original Filed Nov. 17, 1925
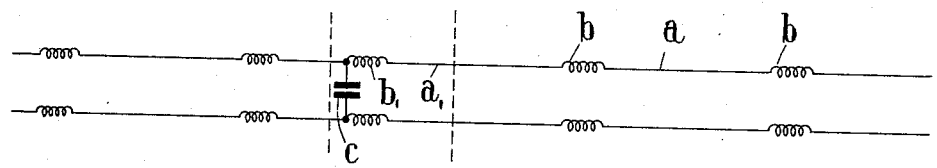
U. Meyer INVENTOR
By: Marks & Clark
           Attys.

Patented Feb. 25, 1930

1,748,453

UNITED STATES PATENT OFFICE

ULFILAS MEYER, OF COLOGNE-MULHEIM, GERMANY, ASSIGNOR TO FELTEN & GUILLEAUM CARLSWERKE ACTIEN-GESELLSCHAFT, OF COLOGNE-MULHEIM, GERMANY

METHOD OF REPAIRING PUPINIZED SUBMARINE CABLES

Original application filed November 17, 1925, Serial No. 69,698, and in Germany November 18, 1924. Divided and this application filed June 7, 1928. Serial No. 283,720.

In my original application for a patent (Serial No. 69,698 of November 17th, 1925) of which this is a divisional application, I have described a method of repairing pupinized submarine electric cables by inserting into the cable a connecting cable piece, in addition to the repaired cable piece, the length of the inserted cable piece being independent of the normal distance of the coils but dependent on the local conditions, in order to fill up the break between the two lifted cable ends. This cable piece is provided with Pupin-coils the total self-inductance of which is to the self-inductance of the normal coil of the cable as the length of the inserted cable piece is to the normal distance between the coils.

In the method just referred to, the inserted cable piece has a higher limit frequency and the dependence on the frequency of the wave resistance is therefore still different from that of the main cable. In order to obtain a better adjustment, according to the present invention the same size of coil is used for the inserted cable piece as for the main cable and the capacity of the inserted piece is increased by means of cross condensers until it is equal to the capacity of a piece of cable having the same length as the normal coil distance. By way of example, the drawing illustrates a pupinized submarine cable with a normal coil distance $a$ of 5 kms. The coils $b$ have a self-inductance of 0.3 H and the capacity of the cable is $0.2\mu F/km.$, that is to say $1\mu F$ per coil distance. Let us assume that when a repair has to be made it is necessary to insert a piece of cable $a_1$ having a length of 2 kms. This piece $a_1$ is provided with a normal coil of 0.3 H. Owing to the repair, the distance between adjacent coils is only 2 kms. at one point. In order to increase the capacity of the piece of cable between these two coils to the normal value of $1\mu F$, it is necessary to insert an additional condenser $c$ of $0.6\mu F$ in parallel with the conductors of the cable.

It has to be pointed out that the conditions above mentioned need not be fulfilled exactly. Even if the adjustment is approximate advantages will be obtained as regards the value of the wave resistance and as regards the value of the limit frequency. It will thus be possible to adopt a middle course between the two proposals and to insert smaller coils, employing types on stock and to employ also smaller condensers for approaching the normal limit frequency, so that again the ratio of self-inductance to capacity will be approximately the same as in the main cable.

In the drawing is shown a twin-core cable but the invention can be applied in the same manner to single-core cables. In this case the one side of the condensers would have to be connected to the armouring.

What I claim is:—

An insertion for the damaged place of a pupinized submarine electric cable comprising a piece of cable the length of which is different from the normal distance between the coils of the pupinized cable, self-inductance coils of the normal size and an additional condenser, which self-inductance coils and condenser are so dimensioned that the wave resistance of the insertion is approximately equal to the wave resistance of the cable.

In testimony whereof I have signed my name to this specification.

ULFILAS MEYER.